United States Patent
Harper et al.

(10) Patent No.: US 7,712,107 B1
(45) Date of Patent: *May 4, 2010

(54) MESSAGE INTEGRATION FRAMEWORK FOR MULTI-APPLICATION SYSTEMS

(75) Inventors: Jonathan E Harper, Louisville, CO (US); Benjamin R Pope, Longmont, CO (US); Rufus S Wavell, Boulder, CO (US)

(73) Assignee: Fair Isaac Corporation, Minneapolis, MN (US)

( * ) Notice: Subject to any disclaimer, the term of this patent is extended or adjusted under 35 U.S.C. 154(b) by 978 days.

This patent is subject to a terminal disclaimer.

(21) Appl. No.: 11/428,343

(22) Filed: Jun. 30, 2006

Related U.S. Application Data

(63) Continuation of application No. 09/915,492, filed on Jul. 25, 2001, now Pat. No. 7,093,261.

(60) Provisional application No. 60/222,094, filed on Jul. 28, 2000.

(51) Int. Cl.
*G06F 13/00* (2006.01)

(52) U.S. Cl. .................. 719/314; 719/311; 719/313; 707/103 R

(58) Field of Classification Search ................ 719/310, 719/311, 313, 314; 707/103 R
See application file for complete search history.

(56) References Cited

U.S. PATENT DOCUMENTS

| | | | |
|---|---|---|---|
| 6,389,588 B1 | 5/2002 | Wadhwa et al. | |
| 6,574,635 B2 * | 6/2003 | Stauber et al. | 707/103 R |
| 6,704,743 B1 * | 3/2004 | Martin | 707/103 R |
| 6,738,975 B1 | 5/2004 | Yee et al. | |
| 6,816,883 B2 | 11/2004 | Baumeister et al. | |

* cited by examiner

*Primary Examiner*—Andy Ho
(74) *Attorney, Agent, or Firm*—Mintz, Levin, Cohn, Ferris, Glovsky and Popeo, P.C.

(57) ABSTRACT

A system and method for integrating messages across multiple applications. The applications may be on one server or on several servers, and each application may service one or more e-clients. The system and method securely segregates the data for each e-client. Further, the system can be dynamically reconfigured by adding or deleting new messages and/or applications, without affecting the performance of the unchanged parts of the system. The various applications using the system need not be aware of the existence of the other applications.

20 Claims, 5 Drawing Sheets

MESSAGE INTEGRATION FRAMEWORK FOR MULTI-APPLICATION SYSTEMS

CROSS-REFERENCE TO RELATED APPLICATIONS

This application is a continuation of U.S. patent application Ser. No. 09/915,492, now U.S. Pat. No. 7,093,261, filed Jul. 25, 2001, which claims benefit of U.S. provisional application Ser. No. 60/222,094, filed Jul. 28, 2000, entitled "Method and Apparatus for Integration Framework" which applications are herein incorporated by reference in their entireties.

BACKGROUND OF THE INVENTION

1. Field of the Invention

The present invention generally relates to middleware systems, and more particularly to middleware systems that use databases to configure the integration of various applications.

2. Description of the Related Art

Vast amounts of data are stored, transmitted, and manipulated in today's Internet driven world. Organization of this data so that information can easily be accessed is thus an important need. Huge amounts of data are often organized in databases. Such stored data often cuts across several databases and other applications that may support a business, and several customers that an Application Service Provider (ASP) may service. The customers serviced by an ASP can be referred to as "e-clients."

A single e-client often uses various applications. For example, an e-client may have an Automatic Call Distributor (ACD) that is used with an Interactive Voice Response (IVR) system to direct customers of the e-client to particular customer service representatives that have expertise in a particular area. Further, the e-client may have a web page which allows its customers to enter into interactive sessions on the web page and learn more information about products and support issues. Further, e-mail can be used by e-clients to contact their customers and for customers to contact the e-client business regarding sales and support issues. Such an e-client may use an IVR application, a web application, and an email application.

These various applications may be on a single server, or on various different servers. In either case, it is desirable to be able to exchange messages between applications, and to route these messages accurately from one application to another, regardless of whether the applications reside on a single server or on different servers.

In some conventional systems, this problem is handled by specifying a configuration file for each application. The configuration file for an application may specify where messages sent by the application are to be delivered. However, when such application specific configuration files are used, it is difficult to dynamically modify or update the system. Any time a change needs to be made (for example, a new e-client is to be added), each of the configuration files for each application on each server need to be updated accordingly.

Another issue arises in systems that integrate multiple applications. Conventionally, each application needs to be aware of the existence of the other applications. Each application also needs knowledge of which server the other applications are using, and so on, in order to route messages to these other applications. One of the problems with such a system is that any time a new application is added or deleted, each of the other applications needs to be modified to reflect that change. Dynamic addition or deletion of applications, while the rest of the applications continue to function in a normal manner, is not possible.

Some conventional applications eliminate this issue by providing a central message processing "hub" which each application is aware of. However, the "hub" solution has another drawback, which is that each message must first be sent to the hub for processing, then re-sent by the hub to the ultimate destination of the message, and this is inefficient.

In addition, several e-clients may use each of these applications. Thus it is important to keep data for each e-client secure, and not allow it to be accessed by any other e-clients. It is thus often desirable to segregate data, regardless of what application requires that data.

There are two ways in which conventional systems deal with this problem. One approach entails having applications which themselves support partitioning of data. However, this approach implies that only applications that have this partitioning capability can be used. Since not all applications possess this capability, systems employing this approach are restricted in the applications they can support.

The second approach entails using separate servers for separate e-clients. However, this approach often results in the increased use of hardware and/or software, and is thus expensive and cumbersome. Hosting multiple e-clients on a single server, and/or using the same software instances of applications for different e-clients, is more economical.

Thus what is needed is (1) a system and method for enabling the configurable exchange of messages between applications, regardless of the servers on which these applications may reside; (2) a system and method for centralizing control of message exchange, but which distributes the message processing to the applications which produce and consume the messages; (3) a system and method for integrating multiple applications, where the various applications do not need to be aware of the existence of the other applications; and (4) a system and method that segregates data for multiple e-clients and multiple applications.

SUMMARY OF THE INVENTION

The present invention is a system and method for enabling the configurable exchange of messages between applications, regardless of the servers on which these applications may reside. The present invention centralizes the control of the messages, but distributes the processing to each application, so that a separate message processing "hub" is not needed. Further, the present invention is a framework for integrating applications, where the various applications do not need to be aware of the existence of the other applications. In addition, the present invention is a method and system for segregating data for multiple applications and multiple e-clients.

An integration framework in accordance with an embodiment of the present invention is a software topology that has a number of different characteristics such as what server an application resides on, what e-client it is servicing, etc. The present invention is database driven, and the various relationships for the different data entities are modeled into the database. The functionality of the system is driven by the database model and by the applications which send and receive messages, which adhere to the rules that are in the database.

In one embodiment, the following data entities are included in the data model: application, partition, metadata, host, message, queue, and queue manager. These various data entities and their relationships with each other (which are represented by the entities app instance, app partition, and app message) are stored in the database. The various applications in the integrated framework communicate with each other through Message-Oriented-Middleware (MOM) modules. In one embodiment, these MOM modules have two layers. One of these layers is specific to the application with which the MOM module is coupled, while the other layer is a layer common to all the MOM modules. This common layer communicated with the database mentioned above, and with the MOM system, also known as the message bus.

In one embodiment of the present invention, the structure of the data model is such that when the application topology is updated in the database, the message routing schema is automatically updated accordingly. In addition, messages, applications, servers, etc. can be added or deleted from the system without affecting the operation of the other, unchanged parts of the system.

BRIEF DESCRIPTION OF THE DRAWINGS

The invention has other advantages and features which will be more readily apparent from the following detailed description of the invention and the appended claims, when taken in conjunction with the accompanying drawing, in which:

DETAILED DESCRIPTION OF THE PREFERRED EMBODIMENTS

Different embodiments of the present invention are now described with reference to the figures, where like reference numbers indicate identical or functionally similar elements. Also in the figures, the left most digit of each reference number corresponds to the figure in which the reference number is first used.

Figure 1:
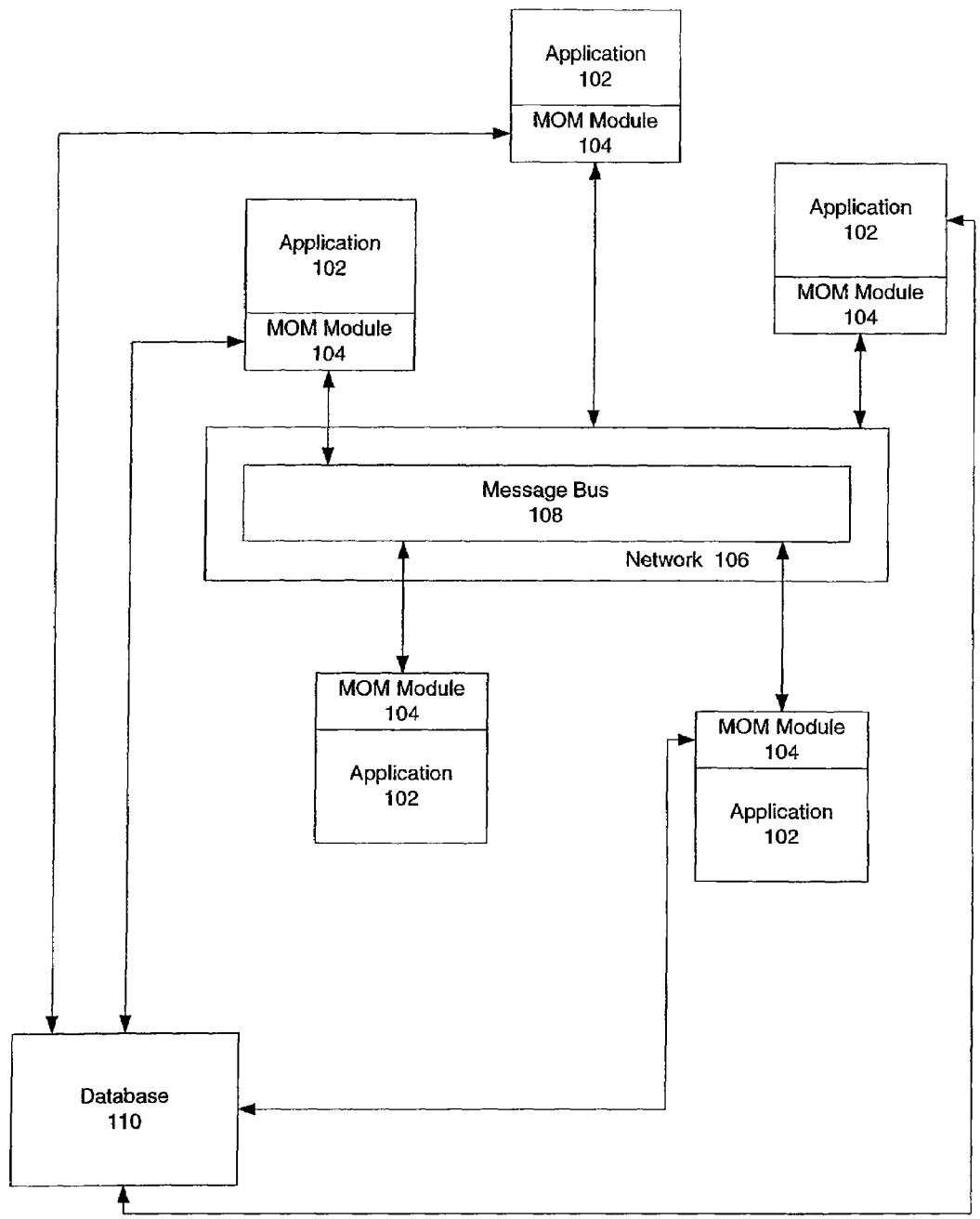
FIG. 1 is a block diagram illustrating an overview of a system in accordance with one embodiment of the present invention.

FIG. 1 is a block diagram of an embodiment of the present invention. FIG. 1 comprises several applications 102, Message Oriented Middleware (MOM) Modules 104, a network 106, a message bus 108, and a database 110.

In one embodiment of the present invention, the applications 102 are standalone applications. An application 102 can be a standalone application having an MOM module 104. An example of such an application is a unified administration application. An application 102 can also be a third party application, where the application's Application Programming Interface (API) is used to interface with the MOM module 104. Some examples of such applications 102 are Octane™ from Epiphany (San Mateo Calif.), WebLine™ from Cisco Systems (San Jose Calif.), and Kana™ from Kana Communications (Redwood City Calif.). The application 102 can also be an unmodified third party application. Such applications could include reporting and email applications. Further application 102 can be a service application modified to use the MOM module 104. Such applications can include monitoring, control, logging, and/or error handling applications. Moreover, an application 102 can also be a custom application which uses the MOM module 104. Such custom applications can include blending applications, and Graphical User Interface (FUI) managers. In addition, an application 102 can be a normal system service application. Such an application could include time applications, security applications, and directory applications. These applications 102 can all be on the same server, or can all be on individual servers. Alternately, some of the applications 102 could share servers, while other applications 102 reside on separate servers.

These applications communicate with each other through a message bus 108 on a network 106. The message bus 108 provides the ability for exchanging messages between applications. In one embodiment, the message bus is a commercial Message-Oriented-Middleware product such as the MQSeries product from IBM Corporation (Armonk, N.Y.). In one embodiment the network 106 could be a Local Area Network (LAN). In another embodiment, the network 106 could be a Wide Area Network (WAN).

In the embodiment shown in FIG. 1, the applications 102 communicate with the message bus 108 through Message Oriented Middleware (MOM) modules 104. In other embodiments, applications 102 may also communicate with each other across a network. In still other embodiments, applications 102 may also use Operating Systems' (OS) interface. That is, an application 102 may use a standard call across the network initiated by the application.

Figure 2:
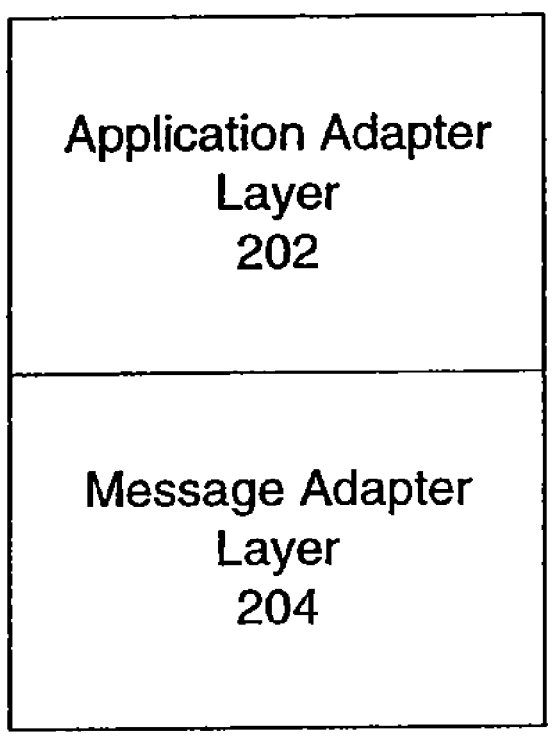
FIG. 2 illustrates a MOM module.

The MOM Modules 104 interact with the database 110. The MOM modules 104 read the configuration database and query it for information regarding message routing. FIG. 2 is a block diagram illustrating the structure of a MOM module 104 in some detail. FIG. 2 illustrates that a MOM module 104 is comprised of two layers: an application adapter layer 202, and a message adapter layer 204. The application adapter is specific to each application 102 that the MOM module 104 interfaces with, and is based on the Application Programming Interface (API) provided by the application 102. The message adapter 204 is the part of the MOM module 104 that communicates with the database 110 to determine the routing of messages sent and received by the MOM module 104.

The database 110 stores data regarding various applications 102 and their characteristics. In one embodiment, the database 110 stores the relationships between the physical servers (hosts), applications, messages and message queues to define the flow of messages in the system. In addition, the one embodiment, the characteristics of the applications 102 are reflected in the database 110. For instance, the database 110 may specify that Application A must reside on its own separate server, or that Application B can only support one partition of data. In one embodiment of the present invention, a partition is a subdivision of the system as a whole to be used by a particular e-client. In one embodiment, a partition and an e-client have a one-to-one relationship. That is, one e-client has only one partition, and one partition corresponds to a single e-client. In other embodiments, an e-client may have more than one partition associated with it.

Further, the database 110 defines the messages used, the relationship of the system components to each other, and the routing of messages. The use of the database 110 provides great flexibility of message routing in a system in accordance with an embodiment of the present invention. Addition of messages or deletion of existing messages is controlled by the database 110, and the applications 102 which use the messages. Neither the MOM modules 104, nor the database 110, needs to be recompiled to add data entities in the database 110 such as Hosts, Applications, Queues, Queue Managers, etc. Messages and MetaData can also be added, modified, or deleted without redesign or recompilation of a system in accordance with one embodiment of the present invention. Further, in one embodiment, these changes can be made while the system is in use, without affecting the operation of other, unchanged parts of the system.

In one embodiment of the present invention, the database 110 is centralized. In other embodiments, the database 110 can be distributed across various servers.

Figure 3:
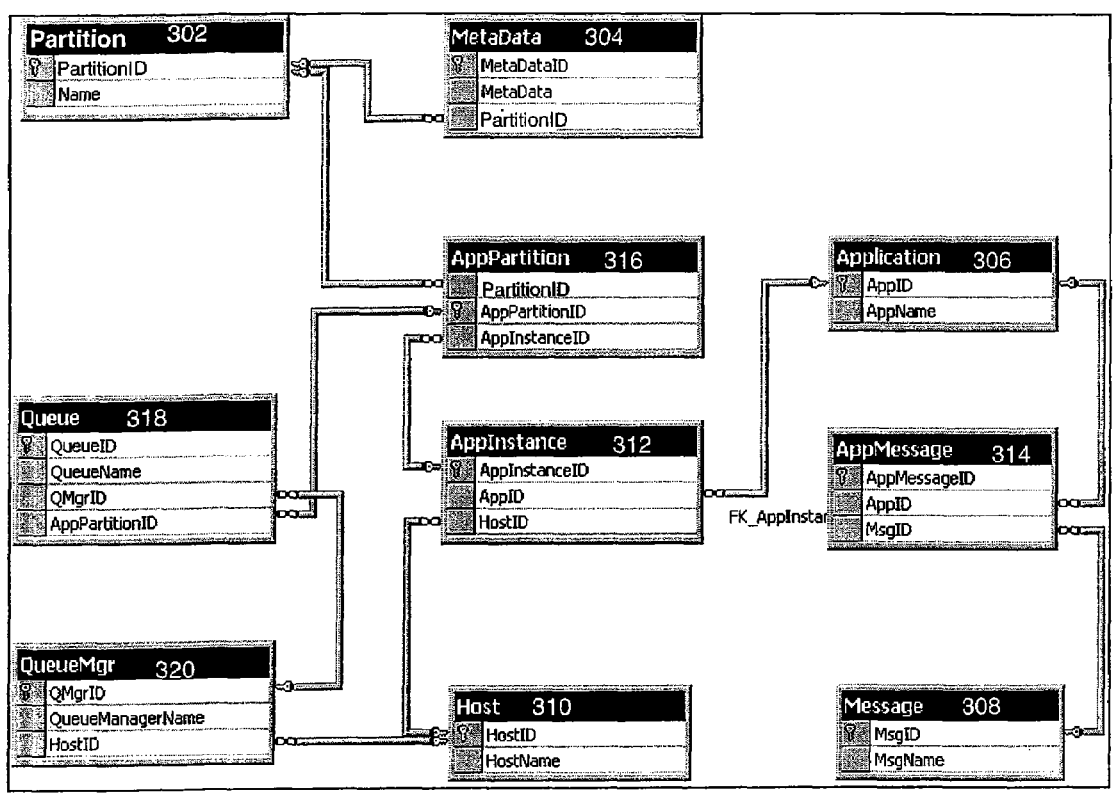
FIG. 3 illustrates a data module in accordance with an embodiment of the present invention.

The data model 310 on which the database is based in one embodiment of the present invention is illustrated in FIG. 3. FIG. 3 illustrates the following data entities: Partition 302, MetaData 304, Application 306, Message 308, Host 310, Appinstance 312, AppMessage 314, AppPartition 316, Queue 318, Queue Manager 320. Each of these data entities is described below. The collection of these data entities and their correlations defines the way in which messages flow between applications 102.

In the embodiment illustrated in FIG. 3, Partition 302 defines one e-client of the system. MetaData 304 defines data which is used to uniquely identify a specific e-client. In one embodiment, this is in addition to the e-client Name, which is only one way to identify the e-client. The MetaData 304 is used to uniquely identify the e-client. MetaData 304 is a component of the message format described below, and is used to determine initially what partition a particular message is intended for.

The data entity Application 306 defines the software applications which comprise the system. Various applications 102 have been discussed above with reference to FIG. 1. Message 308 defines the messages (by a unique message id) which flow through the system. Host 310 defines the physical servers on which Applications 306 may be hosted.

Appinstance 312 defines the relationship between Hosts 310 and Applications 306. Each Appinstance 312 represents an instance of a software application running on a host. A "many-to-many" relationship exists between the Hosts 310 and Applications 306, and the Appinstance 312 data entity is the database modeling method used to implement that relationship. For example many Applications 306 could be running on one Host 310, and one Application 306 could be running on many Hosts 310.

AppMessage 314 defines the relationship between Messages 308 and Applications 306, and AppMessage 314 is the database entity used to implement that relationship. For example many Applications 306 could be associated with one Message 308, and one Application 306 could be associated with many Messages 308.

AppPartition 316 defines the relationship between AppInstances 312 and Partitions 302. A "many-to-many" relationship exists between the AppInstances 312 and Partitions 302, and AppPartition 316 is the database entity used to implement that relationship. For example many AppInstances 312 could be associated with one Partition 302, and one Appinstance 312 could be associated with many Partitions 302.

Queue 318 defines a repository for messages sent and received by an application. Queue 318 has a many-to-one relationship with AppPartition 316, and a many-to-one relationship with QueueMgr 320. That is, many Queues 318 may be associated with an AppPartition 316; many Queues 318 are associated with a QueueMgr 320. In one embodiment, a Queue Manager Name and Queue Name uniquely identify a queue for sending and receiving messages. QueueMgr 320 defines a special software application (the Queue Manager) running on a Host 310. The QueueMgr 320 is required to send and receive messages for Applications 306 on a Host 310, and a "many-to-one" relationship exists between QueueMgr 320 and Host 310, i.e., many QueueMgrs 320 may be associated with one Host 310. In one embodiment, Queues 318 and Queue Managers 320 are third party commercial software products.

In one embodiment of the present invention, the messages to be routed in the system are direct messages from one application 102 to another. In another embodiment, the messages to be routed in the system are broadcast messages to multiple applications 102. In yet another embodiment, direct messages as well as broadcast messages are to be routed. Regardless of what type of messages are to be routed in a system, the messages follow a certain message format.

In one embodiment, the message format consists of keyword-value pairs. The use of keyword-value pairs permits great flexibility in the messages, and also eliminates the need for multiple, nearly identical messages used by different applications. If two applications 102 use essentially the same message, with one keyword difference, then one message can be defined with the superset of keywords used by each application, and when a message of this type is received by an application 102, the application 102 can use the keywords relevant to it and discard the others. Further, there is no need for a specific ordering of keywords. Since the keywords themselves are contained in the message, any application 102 using the message can search the message for the keywords, rather than needing a fixed ordering of the data in the message.

In one embodiment, certain keywords are required to be in a message, while other keywords are optional. The mandatory keywords are used by the system to determine how to handle the message. In one embodiment, these mandatory keywords are those shared in common between multiple messages, and those which affect the routing of messages in the system.

In one embodiment of the present invention, the mandatory keywords are: AppID, MessageID, and MetaData. The MessageID is used to uniquely identify a message. MetaData is used to uniquely identify an e-Client. These two keywords are inserted into the message by the MOM Module 104. Other keywords (such as PartitionID and AppInstanceID) are derived from the AppID, MessageID and MetaData by the MOM module 104 by communicating with the database 110. This is discussed in greater detail below, with reference to FIG. 5.

In one embodiment of the present invention, some of the more commonly present optional fields include CustomerID, Media Unique Identifier (MediaUID), Global Unique Identifier (GUID), MessageID, and DateTimeStamp. CustomerID is the source application (the application 102 which the MOM Module 104 connects to) identifier for the e-Client which the data in the messages belongs to (where applicable). MediaUID is a unique identifier which is provided by the source application. It is carried in the message in case the source application needs it later (for example in a response to a request message). GUID is a system-wide Global Unique Identifier which uniquely identifies a specific instance of a type of message. MessageID is the identifier of the type of message (for example a RequestAgent message). DateTimeStamp is the date and time the message was generated.

An example of a message containing these keywords is:

KEYWORD=AppID\VALUE=2\KEYWORD=MessageID\ VALUE=1010\

KEYWORD=MetaData\VALUE=Development\ KEYWORD=CustomerID\

VALUE=12345\KEYWORD=GUID\VALUE= 103312214176\

KEYWORD=PartitionID\VALUE=3\KEYWORD= AppInstanceID\VALUE=17\

KEYWORD=MessageSize\VALUE=280\KEYWORD=
DateTimeStamp\

VALUE=01012001101426\

A system in accordance with an embodiment of the present invention is a dynamically configurable system. The use of the database 110 provides great flexibility of message routing in the system. Addition of messages, or destinations of existing messages, is completely controlled by database 110 and the applications 102 which use messages. Further, the MOM modules 104 do not require recompilation to add Hosts 310, Applications 306, Queues 318, or Queue Managers 320 to the system. Moreover, in one embodiment, Messages 308 and MetaData 304 can also be added, modified or deleted without redesign or recompilation of a system in accordance with an embodiment of the present system. In addition, in one embodiment, these changes can be made while the system is in use, without affecting the operation of other, unchanged parts of the system.

Figure 4:
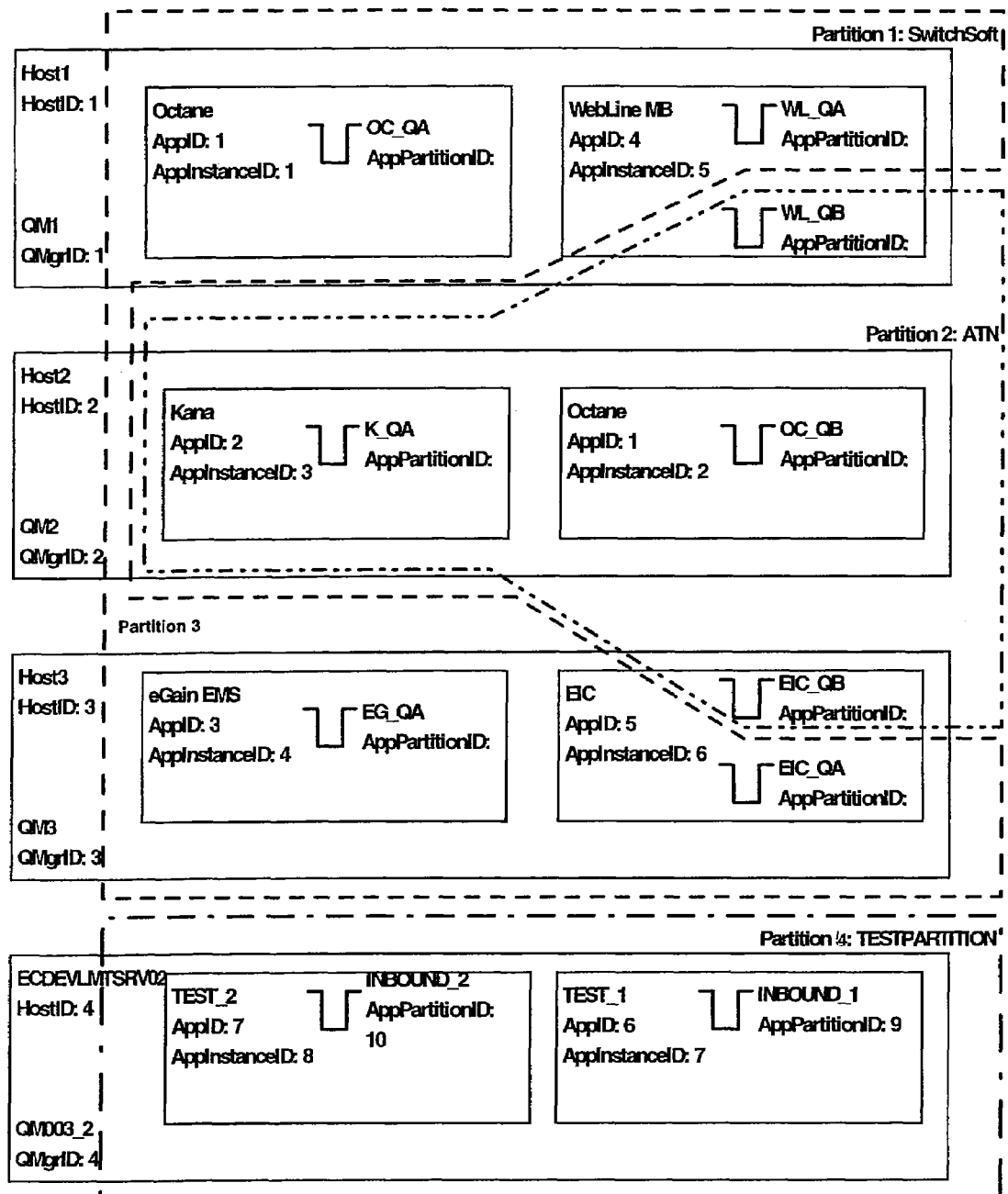
FIG. 4 illustrates an example of a topology including a number of different applications running on different hosts for different partitions.

These aspects of the various embodiments of the present invention can be better understood with the help of an example. FIG. 4 is a diagram which illustrates an example of a topology of a number of different applications 306 running on different hosts 310 for different partitions 302, some of which overlap in various ways. The diagram in FIG. 4 represents data in accordance with the data model in FIG. 2. The topology in FIG. 4 consists of four hosts 310, four partitions 302, seven applications 306, nine app partitions 316, seven app instances 312, and four queue managers 320.

The dotted lines in FIG. 4 indicate different partitions, which may cross multiple hosts 310 and applications 306. The applications 306 shown in FIG. 4 are Octane (AppID=1), Kana (AppID=2), eGain EMS (AppID=3), WevLine MB (AppID=4), EIC (AppID=5), TEST_1 (AppID=6), and TEST_2 (AppID=7). The partitions 302 are SwitchSoft (Partition 1), ATN (Partition 2), Partition 3, and TestPartition (Partition 4). It can be seen from FIG. 4 that some of the applications 306 are used by more than one partition 302. For instance, the EIC (AppID=5) is used by two partitions: Partition 2, and Partition 3. Thus there are two app partitions corresponding to the EIC application: EIC_QA and EIC_QB. Also, one host can have multiple partitions. For instance, Host3 supports both Partition2 and Partition3. Finally, a single partition can overlap across various hosts. For instance, Partition2 overlaps across Host1, Host2, and Host3.

An example of the data that can be stored in the database (in accordance with the datamodel illustrated in FIG. 3) follows.

TABLE 1

APPLICATION DATA ENTITY 306

| AppID | AppName | AppDescription |
|---|---|---|
| 2 | WebLine MB | WebCollab |
| 3 | Blender | Telephone |
| 4 | Octane | CRM |
| 5 | Kana | Email |
| 6 | Switch | Phone |
| 8 | UI Mgr | |

TABLE 2

APPMESSAGE DATA ENTITY 314

| AppMessageID | AppID | MsgID |
|---|---|---|
| 8 | 3 | 1010 |
| 1 | 2 | 1020 |
| 20 | 4 | 1020 |

TABLE 2-continued

APPMESSAGE DATA ENTITY 314

| AppMessageID | AppID | MsgID |
|---|---|---|
| 53 | 8 | 1020 |
| 79 | 8 | 1020 |

TABLE 3

MESSAGE DATA ENTITY 308

| MsgID | MsgName |
|---|---|
| 1010 | RequestAgent |
| 1020 | AgentAssigned |
| 1025 | AgentConnected |
| 1030 | AgentAssigned-WebLine |
| 1040 | AgentAssigned-Kana |
| 1050 | AgentFree |
| 1060 | AgentNotAssigned |
| 1070 | AgentNotAssigned-WebLine |
| 1080 | AgentNotAssigned-Kana |
| 1110 | ReRequestAgent |
| 1210 | AuthorizeAgentResponse |
| 1220 | AuthorizeAgentResponse |
| 1310 | SecondLineCallbackRequest |
| 1320 | SecondLineCallbackResponse |
| 1410 | TranscationQueued |
| 2010 | AgentSignedOn |
| 2020 | AgentSignedOff |
| 2110 | AgentAvailable |
| 2120 | AgentNotAvailable |
| 3010 | TransferOut |
| 3020 | TransferIn |
| 6010 | AddMessage |
| 6020 | AddMessageResponse |
| 6110 | DeleteMessage |
| 6130 | DeleteMessageNotification |
| 6210 | ConfigurationChange |
| 7010 | UATransactionRequest |
| 7020 | UATransactionResponse |
| 9110 | PingRequest |
| 9120 | PingResponse |
| 9210 | StopRequest |
| 9220 | StopResponse |
| 9310 | Re-InitRequest |
| 9320 | Re-InitResponse |
| 9410 | MonitorRequest |
| 9420 | MonitorResponse |
| 9999 | Error |

TABLE 4

HOST DATA ENTITY 310

| HostID | HostName |
|---|---|
| 8 | ECLABLMTSRV06 |
| 11 | ECLABLMTSRV03 |
| 12 | ECLABLMTSRV08 |
| 17 | ECDEVLMTSRV06 |
| 21 | ECDEVLMTSRV09 |

TABLE 5

APPINSTANCE DATA ENTITY 312

| AppInstanceID | AppID | HostID | AppDescription |
|---|---|---|---|
| 17 | 2 | 17 | |
| 25 | 3 | 12 | |
| 39 | 4 | 21 | |

TABLE 5-continued

APPINSTANCE DATA ENTITY 312

| AppInstanceID | AppID | HostID | AppDescription |
|---|---|---|---|
| 18 | 5 | 11 | |
| 14 | 8 | 8 | |

TABLE 6

PARTITION DATA ENTITY 302

| PartitionID | Name |
|---|---|
| 2 | Company A |
| 3 | Development |

TABLE 7

METADATA DATA ENTITY 304

| MetaDataID | MetaData | PartitionID |
|---|---|---|
| 9 | Development | 3 |
| 18 | Partition:3 | 3 |

TABLE 8

APPPARTITION DATA ENTITY 316

| AppPartitionID | AppInstanceID | PartitionID |
|---|---|---|
| 14 | 14 | 3 |
| 17 | 17 | 3 |
| 18 | 18 | 3 |
| 24 | 25 | 3 |
| 33 | 34 | 3 |
| 41 | 39 | 3 |
| 68 | 52 | 3 |

TABLE 9

QUEUEMGR DATA ENTITY 320

| QMgrID | QueueManagerName | HostID |
|---|---|---|
| 8 | QM001_2 | 8 |
| 11 | QM015_2 | 11 |
| 13 | QM012_2 | 12 |
| 10 | QM003_2 | 17 |
| 22 | QM006_2 | 21 |

TABLE 10

QUEUE DATA ENTITY 318

| QueueID | QueueName | QMgrID | AppPartitionID |
|---|---|---|---|
| 13 | UIM.3.IN | 8 | 14 |
| 16 | WLMB.3.IN | 10 | 17 |
| 17 | KANA.3.IN | 11 | 18 |
| 18 | BLDR.3.IN | 13 | 24 |
| 50 | WLMB.3.IN | 20 | 33 |
| 57 | OCTN.3.IN | 22 | 41 |
| 84 | KANA.3.IN | 10 | 68 |

In one embodiment, several views can be created using the data in the tables above. Apart from the data entities illustrated in FIG. 3, the created views can also be queried to obtain information. In one embodiment, the following views are created:

CREATE VIEW cbo.MetaData_Queue As

SELECT md.MetaData, p.Name PartitionName, app.AppInstanceID, q.QueueName, q.qmgrid, p.PartitionID PartitionID FROM MetaData and INNER JOIN Partition p ON md.PartitionID=p.PartitionID INNER JOIN AppPartition ap ON p.PartitionID=ap.PartitionID INNER JOIN Queue q ON ap.AppPartitionID=q.AppPartitionID CREATE VIEW dbo.MessageListAS SELECT m.MsgID, m.MsgName, a.AppName FROM Application a INNER JOIN AppMessage am ON a.AppID=am.AppID INNER JOIN Message m ON am.MsgID=m.MsgID CREATE VIEW dbo.qmgr_qname AS SELECT ml.MsgID, mdq.MetaData, qm.QueueManagerName, mdq.QueueName, mdq.PartitionID, mdq.PartitionName, a.appid DestAppID FROM metadata_queue mdq.Appinstance ap, Application a, messagelistml, QueueMgr qm WHERE mdq.AppInstanceID=ap.AppInstanceID AND ap.AppID=a.AppID AND a.AppName=ml.appname AND mdq.qmgrid=qm.QMgrID These queues contain the following data:

TABLE 11

METADATA_QUEUE VIEW

| MetaData | Partition Name | AppInstance ID | QueueName | Qmgr id | PartitionID |
|---|---|---|---|---|---|
| Development | Development | 14 | UIM.3.IN | 8 | 3 |
| Partition:3 | Development | 14 | UIM.3.IN | 8 | 3 |
| Development | Development | 17 | WLMB.3.IN | 10 | 3 |
| Partition:3 | Development | 17 | WLMB.3.IN | 10 | 3 |
| Development | Development | 18 | KANA.3.IN | 11 | 3 |
| Partition:3 | Development | 18 | KANA.3.IN | 11 | 3 |
| Development | Development | 25 | BLDR.3.IN | 13 | 3 |
| Partition:3 | Development | 25 | BLDR.3.IN | 13 | 3 |
| Development | Development | 39 | OCTN.3.IN | 22 | 3 |
| Partition:3 | Development | 39 | OCTN.3.IN | 22 | 3 |

TABLE 12

MESSAGELIST VIEW

| MsgID | MsgName | AppName |
|---|---|---|
| 1010 | RequestAgent | Blender |
| 1020 | AgentAssigned | WebLineMB |
| 1020 | AgentAssigned | Octane |
| 1020 | AgentAssigned | UI Mgr |
| 1020 | AgentAssigned | Kana |

TABLE 13

QMGR_QNAME VIEW

| Msg ID | MetaData | Queue Manager Name | QueueName | Partition ID | Partition Name | Dest AppID |
|---|---|---|---|---|---|---|
| 1020 | Development | QM002_2 | WLMB.3.IN | 3 | Development | 2 |
| 1020 | Partition: 3 | QM002_2 | WLMB.3.IN | 3 | Development | 2 |
| 1020 | Development | QM001_2 | UIM.3.IN | 3 | Development | 8 |
| 1020 | Partition: 3 | QM001_2 | UIM.3.IN | 3 | Development | 8 |
| 1020 | Development | QM003_2 | WLMB.3.IN | 3 | Development | 2 |
| 1020 | Partition: 3 | QM003_2 | WLMB.3.IN | 3 | Development | 2 |
| 1020 | Development | QM015_2 | KANA.3.IN | 3 | Development | 5 |
| 1020 | Partition: 3 | QM015_2 | KANA.3.IN | 3 | Development | 5 |
| 1010 | Development | QM012_2 | BLDR.3.IN | 3 | Development | 3 |
| 1010 | Partition: 3 | QM012_2 | BLDR.3.IN | 3 | Development | 3 |
| 1020 | Development | QM006_2 | OCTN.3.IN | 3 | Development | 4 |
| 1020 | Partition: 3 | QM006_2 | OCTN.3.IN | 3 | Development | 4 |
| 1020 | Development | QM003_2 | KANA.3.IN | 3 | Development | 5 |
| 1020 | Partition: 3 | QM003_2 | KANA.3.IN | 3 | Development | 5 |

For a system with a database 110 with the above data entity tables and views, a query against the Qmgr_Qname view with the parameters of MsgID=1010 and MetaData='Development' returns this information:

TABLE 14

| Msg ID | MetaData | Queue Manager Name | Queue Name | Partition ID | Partition Name | Dest App ID |
|---|---|---|---|---|---|---|
| 1010 | Development | QM012_2 | BLDR.3.IN | 3 | Development | 3 |

The single row result set from the query indicates that in this example, there is one destination for the message given that metadata:

QueueManagerName=QM012_2,

QueueName=BLDR.3. IN

This uniquely identifies the destination for the message id and metadata combination. A simple change in configuration, for example, making a new assignment of an existing message to an existing application, results in adding a row to the AppMessage table like this:

TABLE 15

| AppMessageID | AppID | MsgID |
|---|---|---|
| 81 | 5 | 1010 |

This results in a change in the data returned by the views, with the ultimate result that a query against the Qmgr_Qname view returns this information:

TABLE 16

| Msg ID | MetaData | Queue Manager Name | Queue Name | Partition ID | Partition Name | Dest App ID |
|---|---|---|---|---|---|---|
| 1010 | Development | QM012_2 | BLDR.3.IN | 3 | Development | 3 |
| 1010 | Development | QM003_2 | KANA.3.IN | 3 | Development | 5 |

Another example involves a more complex configuration. In this example, adding a new message results in two changes. The first change is the addition of the message to the message table:

TABLE 17

| MsgID | MsgName |
|---|---|
| 8000 | NewMessage |

The second change due to the addition of a new message is the addition of the message to the AppMessage table, defining which applications this message is routed to:

TABLE 18

| AppMessageID | AppID | MsgID |
|---|---|---|
| 82 | 5 | 8000 |

This also results in a change in the data returned by the views, with the ultimate result that a query against the Qmgr_Qname view with the parameters of MsgID=8000 and MetaData=Development returns this information:

TABLE 19

| Msg ID | MetaData | Queue Manager Name | Queue Name | Partition ID | Partition Name | Dest App ID |
|---|---|---|---|---|---|---|
| 8000 | Development | QM003_2 | KANA.3.IN | 3 | Development | 5 |

Figure 5:
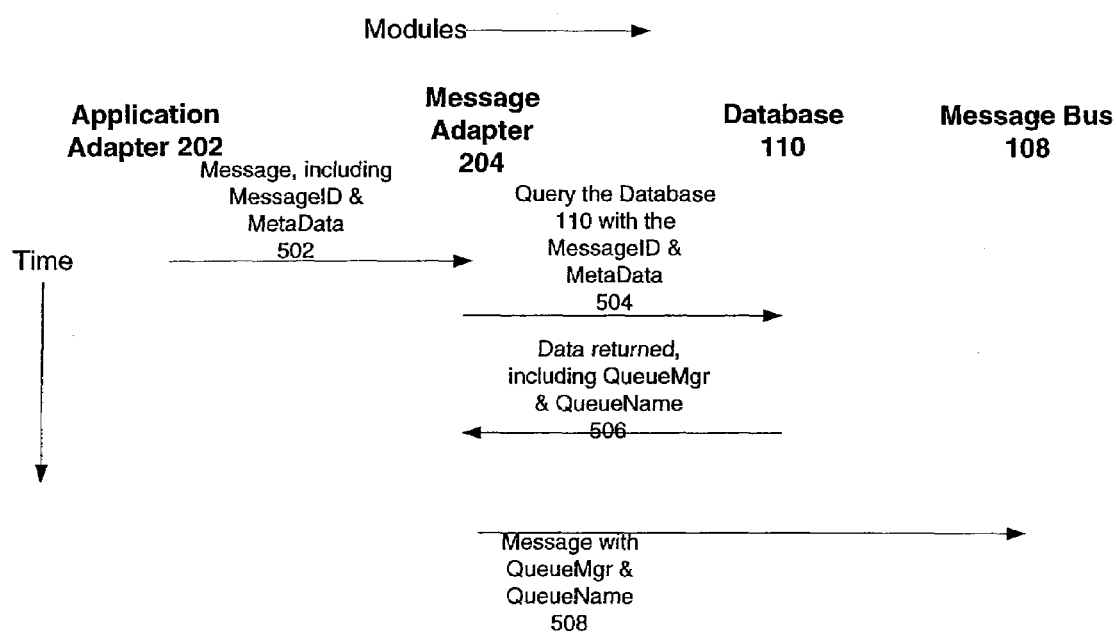
FIG. 5 is a dataflow diagram illustrating the exchange of information between a MOM module and the database in one embodiment of the present invention.

Another query, given AppID (which is compiled into the Application Adapter 202) and HostName, determines the Queue Manager Name and Queue Name on which incoming messages are received for an AppPartition 316. Any messages received on this queue (or set of queues) are automatically delivered to the Application Adapter 202 which provided the information for the original query. FIG. 5 is a dataflow diagram which illustrates this interaction between the MOM modules 104 and the database 110.

Referring to FIG. 5, it can be seen that various modules of the system 100 are represented along the X-axis and time is represented along the Y-axis, time increasing downwards. The modules shown in FIG. 5 are the application adapter 202, the message adapter 204, and the database 110.

The application adapter 202 supplies 502 the MessageID and the MetaData in the message to the message adapter 204 layer. The message adapter 204 then queries 504 the database 110 with this data. Next, the database 110 returns 506 data to the message adapter 204. This data includes the QueueManagerName and the QueueName. The message is then passed to the message bus 108. In one embodiment, this message is sent via a MQSeries API call.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the following claims.

The invention claimed is:

1. A middleware system for configuring the integration of plurality of applications, the system comprising:
   a database storing data regarding the plurality of applications, the data being stored in accordance with a data model; and
   a computing system executing a Message-Oriented-Middleware (MOM) module communicatively coupled to one of the plurality of applications and to the database, the MOM module comprising:
      a first layer specific to the one of the plurality of applications to which the MOM module is coupled; and
      a second layer, communicatively coupled to the first layer, for communicating with the database;
   wherein the MOM module processes message associated with the one of the plurality of applications to which the MOM module is coupled by:
      sending a message from the application adapter to the message adapter, the message including a message identification and metadata;
      responsive to receiving the message sent by the application adapter, querying the database with the message identification and the metadata; and
      sending, by the message adapter to a message bus, the message with a queue manager and a queue name, the queue manager and the queue name being obtained from the database.

2. The system of claim 1, wherein the data stored in the database in accordance with a data model, the data model comprising:
   a partition data entity which corresponds to an e-Client;
   a metadata data entity which is used to uniquely identify the e-Client;
   an application data entity which defines the plurality of applications;
   a message data entity which defines messages which flow through the system; and
   a host data entity which defines servers in the system.

3. The system of claim 2, the data model further comprising:
   an app instance data entity which identifies the servers on which each of the plurality of applications is located;
   an app message data entity which identifies the messages sent to and received by each of the plurality of applications; and
   an app partition data entity which associates the plurality of applications with the e-Clients.

4. The system of claim 2, wherein the data model further comprises:
   a queue data entity defining a repository of messages sent and received by the plurality of applications; and
   a queue manager data entity for allowing a queue to run on a server.

5. The system of claim 2, wherein a new application can be integrated by adding it to the application data entity, wherein the addition of the new application does not interrupt the performance of the system.

6. The system of claim 2, wherein a new message can be routed by adding it to the message data entity, wherein the addition of the new message does not interrupt the performance of the system.

7. A middleware system for configuring the integration of a plurality of applications, and routing messages between the plurality of applications, the system comprising:
   a database storing data regarding the plurality of applications, the data being stored in accordance with a data model, wherein the data model allows for addition of new applications without modification of the existing plurality of applications; and
   a computing system executing a Message-Oriented-Middleware (MOM) module communicatively coupled to one of the plurality of applications and to the database, the MOM module comprising:
      an application adapter layer specific to the one of the plurality of applications to which the MOM module is coupled; and
      a message adapter layer, communicatively coupled to the application adapted layer, for communicating with the database;
   wherein the MOM module processes message associated with the one of the plurality of applications to which the MOM module is coupled by:
      sending a message from the application adapter to the message adapter, the message including a message identification and metadata;
      responsive to receiving the message sent by the application adapter, querying the database with the message identification and the metadata; and
      sending, by the message adapter to a message bus, the message with a queue manager and a queue name, the queue manager and the queue name being obtained from the database.

8. The system of claim 7, wherein the data model further allows for routing of new messages between the plurality of applications, without modification of the existing plurality of applications.

9. A method for routing messages from an application in an integrated framework, the framework comprising a centralized database and a plurality of Message-Oriented-Middleware (MOM) modules, at least one MOM module coupled to one of the plurality of applications and to the database and including an application adapter and a message adapter, the method comprising:

processing, by at least one MOM module, of the messages associated with the one of the plurality of applications to which the MOM module is coupled; and controlling, in accordance with the centralized database, the distributed processing of the messages by the plurality of the MOM modules;

wherein the processing comprises:

sending a message from the application adapter to the message adapter, the message including a message identification and metadata;

responsive to receiving the message sent by the application adapter, querying the database with the message identification and the metadata; and sending, by the message adapter to a message bus, the message with a queue manager and a queue name, the queue manager and the queue name being obtained from the database.

10. The method of claim 9, wherein the controlling comprises:

receiving, by the database, a query from one of the plurality of MOM modules, the query including message identification and metadata; and returning to the one of the plurality of MOM modules data including a queue manager and a queue name, the queue name identifying the queue to which the message is sent.

11. The method of claim 9, wherein the database is distributed across two or more servers.

12. The method of claim 9, wherein a queue corresponding to the queue name defines a repository for messages sent and received by an application.

13. The method of claim 9, wherein messages are routed from a first application solely to a second application.

14. The method of claim 9, wherein the messages are broadcast messages routed from a first application to a plurality of second applications.

15. The method of claim 9, wherein a format of the messages comprises keyword-value pairs format.

16. The method of claim 15, wherein if two messages are substantially identical with the exception of one keyword difference, then one of such messages can be defined with a superset of keywords used by each application.

17. The method of claim 15, wherein the messages contain more keywords than required by an application, and such application can use only those keywords that are relevant to such application and discard any remaining keywords.

18. The method of claim 15, wherein the keywords are not ordered, and a receiving application searches messages for keywords.

19. The method of claim 15, wherein messages comprise mandatory keywords that are used to determine how to handle the message, the mandatory keywords being used to route the messages.

20. The method of claim 9, wherein the data stored in the database in accordance with a data model, the data model comprising:

a partition data entity which corresponds to an e-Client;

a metadata data entity which is used to uniquely identify the e-Client;

an application data entity which defines the plurality of applications;

a message data entity which defines messages which flow through the system; and a host data entity which defines servers in the integration framework.

\* \* \* \* \*